Patented July 3, 1934

1,965,362

UNITED STATES PATENT OFFICE

1,965,362

METHOD OF PRODUCING SMOKELESS POWDER

David R. Wiggam, Kenvil, N. J., assignor to Hercules Powder Company, Wilmington, Del., a corporation of Delaware No Drawing. Application September 16, 1929, Serial No. 393,131

7 Claims. (Cl. 52—20)

My invention relates to an improvement in smokeless powder, and more particularly to the smokeless powder known as "bulk powder", which is so produced as to occupy the same volume as an equivalent charge of black powder and therefore can be measured by the same measuring devices as black powder.

In the manufacture of bulk powder heretofore, it has been customary, for example, to mix barium nitrate with a relatively small amount of aurine in the presence of a small amount of water. After preliminary mixing, nitrocotton containing about 38% of moisture is added and the mixing continued for a further period, after which paraffin oil and a quantity of agar-agar, previously gelled by treating in hot water, are added and the mixing continued. When proper mixture is obtained, the mixture is forced through a screen for the formation of grains and rotated in a glaze barrel suitably heated for a period in order to smooth out the grains, which, as they come from the screen, are quite rough. The powder is then screened through an 8 mesh shaker screen to remove coarse grains, which may be reworked. The screened powder is then placed in canvas trays and dried in a dry house at suitable temperature. The dry powder is screened, and that passing a 12 mesh and retained by a 30 mesh screen is placed in a hardening drum with a hardening solvent consisting, for example, of a mixture of benzol and acetone. The hardening drum is rotated in boiling water for a period of time, during which excess solvent is evaporated. From the hardening drum the powder is removed to a dry house and dried to a total volatile content of 1½%. The dry powder is screened to remove dust and lumps, after which it is ready for use.

The bulk powder heretofore produced possesses a number of disadvantages, among which are that it is of high hygroscopicity, the grains are relatively soft, which results in dusting during handling and loading, and of high price due to the nature of the manufacturing operations.

Now, in accordance with my invention, I provide a method for the production of bulk powder, which may be readily and inexpensively carried out with the production of a powder of superior quality and characteristics in that it will be clean burning, will have a relatively hard uniform grain, will have good flowing properties, good pressure-velocity relation, will not have undesirable hygroscopicity, and may be given a desirable burning rate through control in production.

In accordance with my invention, I subject a mixture or partial solution of water wet nitrocellulose in a solvent, or solvent mixture, to the action of a body of water of relatively high temperature to effect rapid evaporation of the solvent. In accordance with my invention, for example, nitrocellulose, which may be provided by nitrocotton freshly prepared, scrap nitrocotton, cannon powder scrap, or the like, is thoroughly mixed with from 10 to 30 per cent. water, and to the water wet nitrocellulose there is added a suitable solvent which may be readily volatilized, as, for example, acetone, alcohol, ether mixture, ethyl acetate, or the like, which may be diluted, for example, with alcohol, or the like. The mixture formed is then expressed through a screen to form strands, which may be cut into grains, or the powder otherwise grained, and then immersed in a body of water at a temperature which will cause rapid evaporation of the solvent, say at a temperature of 170° F.–175° F.

In accordance with my invention, various ingredients desirably present in bulk powder, as, for example, a deterrent as di-ethyl phthalate, ethyl abietate, or the like, an oxidizing agent, as iron oxide, lead peroxide, lead chromate, lead sulfate, barium sulfate, or the like, and a substance insoluble in the solvent used, as, for example, high nitration nitrocotton, nitrated starch, nitroglycerin, or the like, may be admixed with the powder before graining and elimination of solvent.

As a more specific practical adaptation of the method embodying my invention, for example, a solution is formed of nitrocotton wet with from 10 to 30 per cent. of water dissolved in a mixture consisting of, for example, 70% ether and 30% ethyl alcohol, 100 parts of the nitrocotton, on a dry basis, being dissolved in 150 parts of the solvent mixture. A deterrent, oxidizing salt or other substances, as indicated, may be admixed with the mixture or partial solution. When the mixing is completed, which may require from 15 to 30 minutes, the mixture may be grained by extrusion through a perforated plate or screen, the strands produced being cut into grains of desired length. The grains produced are passed or permitted to fall into a still pot containing water at a temperature of (say) 170° F. to 175° F., which will act to very rapidly evaporate the solvent. After evaporation of the solvent, the powder is removed from the still pot, drained, air-dried, glazed if desired, and screened. Where an oxidizing salt is desired as a component of the powder, it may be introduced by adding a soluble salt such as barium or potassium nitrate to the water in the still pot.

While in carrying my invention into practice no particular form of apparatus is required, it will be desirable, after mixing of the ingredients of the powder, to extrude the mixture by means of a suitable hydraulic or mechanical press through a die on the face of which a cutting knife rotates in order to form the powder into grains. Desirably the die and knife, or other graining device, are located in a stream of water vapor and hot solvent vapor from a still pot into which the powder grains fall for removal of the solvent therefrom. The stream of hot vapors contacting with the powder grains as formed will cause a surface hardening of the grains which will prevent their sticking together.

It will also be appreciated that in carrying out of the method the solvents eliminated from the powder through the medium of hot water may be readily recovered for re-use.

Having now fully described my invention, what I claim and desire to protect by Letters Patent is:

1. The method of producing bulk powder which includes wetting nitrocellulose with water, partially dissolving the wet nitrocellulose in a solvent, and introducing the solution into water containing an oxidizing salt in solution and at a temperature sufficient to evaporate the solvent very rapidly.

2. The method of producing bulk powder which includes admixing nitrocellulose with 10%–30% of water by weight, admixing the wet nitrocellulose with a solvent and introducing the solution formed into water at a temperature within about the range 170° F.–175° F.

3. The method of producing bulk powder which includes wetting nitrocellulose with water, partially dissolving the wet nitrocellulose in a solvent, graining the powder in a stream of hot water vapor and introducing the grains into water at a temperature sufficient to evaporate solvent carried thereby very rapidly.

4. The method of producing bulk powder which includes wetting nitrocellulose with water, partially dissolving the wet nitrocellulose in a solvent, graining the powder in a stream of vapor at a temperature sufficient to evaporate solvent from the surface of the grains as formed, and introducing the grains into water at a temperature sufficient to evaporate solvent carried thereby very rapidly.

5. The method of producing bulk powder which includes wetting nitrocellulose with water, partially dissolving the wet nitrocellulose in a solvent and mechanically graining the powder in the presence of a hot vapor at a temperature at which the grains will be surface hardened by the evaporation of solvent from the surfaces thereof as formed.

6. The method of producing bulk powder which includes wetting nitrocellulose with water, partially dissolving the wet nitrocellulose in a solvent and mechanically graining the powder in a stream of hot water vapor at a temperature at which the grains will be surface hardened by the evaporation of solvent from the surfaces thereof as formed.

7. The step in the method of producing bulk powder which includes mechanically graining the powder in the presence of a hot vapor at a temperature at which the grains will be surface hardened by the evaporation of solvent from the surfaces thereof as formed.

DAVID R. WIGGAM.